(12) United States Patent
Swinnen et al.

(10) Patent No.: US 7,514,009 B2
(45) Date of Patent: Apr. 7, 2009

(54) DEVICES AND PROCESSES FOR USE IN ULTRASOUND TREATMENT

(75) Inventors: Mario Swinnen, Paal (BE); Harold Moffat, Long Valley, NJ (US); Edward S. Beardwood, New Market (CA); Baudouin Hannecart, Brussels (BE); Eric D. Cordemans de Meulenaer, Wezembeek (BE)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 516 days.

(21) Appl. No.: 11/327,193

(22) Filed: Jan. 6, 2006

(65) Prior Publication Data

US 2007/0000844 A1    Jan. 4, 2007

Related U.S. Application Data

(63) Continuation-in-part of application No. 10/734,103, filed on Dec. 10, 2003, which is a continuation-in-part of application No. PCT/US2004/021664, filed on Jul. 7, 2004, now Pat. No. 7,048,863.

(60) Provisional application No. 60/485,888, filed on Jul. 8, 2003.

(51) Int. Cl.
  *C02F 1/48*  (2006.01)
  *B06B 1/00*  (2006.01)
  *A61L 2/025* (2006.01)

(52) U.S. Cl. ............ 210/748; 210/167.01; 210/167.02; 210/171; 210/220; 422/20; 422/128; 101/148; 101/483

(58) Field of Classification Search ............... 210/748, 210/758, 167.01, 167.02, 171, 220; 422/20, 422/128; 451/53, 449; 101/148, 423, 451, 101/483
See application file for complete search history.

(56) References Cited

U.S. PATENT DOCUMENTS 2,163,649 A    6/1939  Weaver
(Continued)

FOREIGN PATENT DOCUMENTS

DE        44 07 564      9/1995
(Continued)

OTHER PUBLICATIONS

Böhm et al., "Viability of plant cell suspensions exposed to homogeneous ultrasonic fields of different energy density and wave type," Ultrasonics, vol. 38, pp. 629-632 (2000).
Heuter, et al., "Sonics, techniques for the use of sound and ultrasound in engineering and science," John Wiley & Sons, Inc., New York, pp. 230, (1955).
(Continued)

*Primary Examiner*—Robert A Hopkins
(74) *Attorney, Agent, or Firm*—Knobbe Martens Olson & Bear LLP

(57) ABSTRACT

Devices and methods are provided for treating, preventing from growth, and neutralizing microorganisms using high-frequency, low-energy ultrasound. A particular method is provided for treating a fountain solution including simultaneously exposing the fountain solution to gas microbubbles and high-frequency ultrasound. A particular device is also provided, including a compartment for holding a reservoir of fountain solution, a gas microbubble emitter configured to emit microbubbles into the compartment, and a high-frequency ultrasound-emitter configured to emit ultrasound signals into the compartment. The high-frequency ultrasound may be higher than 100 kHz.

21 Claims, 4 Drawing Sheets

U.S. PATENT DOCUMENTS

| | | | |
|---|---|---|---|
| 2,717,874 A | 9/1955 | Verain | |
| 3,257,941 A | 6/1966 | Wolfson et al. | |
| 3,634,243 A | 1/1972 | Wessels et al. | |
| 3,672,823 A | 6/1972 | Boucher | |
| 4,003,832 A | 1/1977 | Henderson et al. | |
| 4,076,617 A | 2/1978 | Bybel et al. | |
| 4,144,722 A | 3/1979 | Mattwell | |
| 4,211,744 A | 7/1980 | Boucher | |
| 4,294,853 A | 10/1981 | Williams et al. | |
| 4,514,149 A | 4/1985 | Kanebako et al. | |
| 4,602,184 A | 7/1986 | Meitzler | |
| 4,605,507 A | 8/1986 | Windgassen et al. | |
| 4,820,260 A | 4/1989 | Hayden | |
| 4,854,969 A | 8/1989 | Bassemir et al. | |
| 4,879,045 A | 11/1989 | Eggerichs | |
| 4,961,860 A | 10/1990 | Masri | |
| 4,971,991 A | 11/1990 | Umemura et al. | |
| 4,975,109 A | 12/1990 | Friedman, Jr. et al. | |
| 5,130,031 A | 7/1992 | Johnston | |
| 5,130,032 A | 7/1992 | Sartori | |
| 5,145,981 A | 9/1992 | Willingham | |
| 5,149,319 A | 9/1992 | Unger | |
| 5,198,122 A | 3/1993 | Koszalka et al. | |
| 5,215,680 A | 6/1993 | D'Arrigo | |
| 5,224,051 A | 6/1993 | Johnson | |
| 5,256,182 A | 10/1993 | Friedman, Jr. et al. | |
| 5,279,648 A | 1/1994 | Chase | |
| 5,308,388 A | 5/1994 | Schell | |
| 5,380,411 A | 1/1995 | Shlief | |
| 5,401,237 A | 3/1995 | Tachibana et al. | |
| 5,416,210 A | 5/1995 | Sherba et al. | |
| 5,523,058 A | 6/1996 | Umemura | |
| 5,534,172 A | 7/1996 | Perry et al. | |
| 5,558,092 A | 9/1996 | Unger et al. | |
| 5,593,596 A | 1/1997 | Bratten | |
| 5,611,993 A | 3/1997 | Babaev | |
| 5,616,544 A | 4/1997 | Kalota et al. | |
| 5,622,620 A | 4/1997 | Meenan et al. | |
| 5,632,886 A | 5/1997 | Staniec | |
| 5,637,444 A | 6/1997 | Matsumoto | |
| 5,695,550 A | 12/1997 | Marx et al. | |
| 5,713,282 A | 2/1998 | MacPhee | |
| 5,827,204 A | 10/1998 | Grandia et al. | |
| 5,971,949 A | 10/1999 | Levin et al. | |
| 5,997,812 A | 12/1999 | Brunham et al. | |
| 6,068,857 A | 5/2000 | Weitschies et al. | |
| 6,077,431 A | 6/2000 | Kawanishi et al. | |
| 6,113,558 A | 9/2000 | Rosenschein et al. | |
| RE36,939 E | 10/2000 | Tachibana et al. | |
| 6,221,814 B1 | 4/2001 | Kaburagi et al. | |
| 6,242,391 B1 | 6/2001 | Fukutani et al. | |
| 6,258,759 B1 | 7/2001 | Futahashi et al. | |
| 6,293,198 B1 * | 9/2001 | Mizuno | 101/483 |
| 6,308,714 B1 | 10/2001 | Peterson et al. | |
| 6,309,355 B1 | 10/2001 | Cain et al. | |
| 6,322,749 B1 | 11/2001 | McCarthy et al. | |
| 6,342,522 B1 | 1/2002 | Mason et al. | |
| 6,413,216 B1 | 7/2002 | Cain et al. | |
| 6,428,532 B1 | 8/2002 | Doukas et al. | |
| 6,447,720 B1 | 9/2002 | Horton et al. | |
| 6,450,738 B1 | 9/2002 | Ripley | |
| 6,503,449 B1 | 1/2003 | Smith | |
| 6,506,584 B1 | 1/2003 | Chandler et al. | |
| 6,518,225 B1 | 2/2003 | Fukutani et al. | |
| 6,540,922 B1 | 4/2003 | Cordemans et al. | |
| 6,656,436 B1 | 12/2003 | Sentagnes et al. | |
| 6,736,979 B2 | 5/2004 | de Meulenaer et al. | |
| 6,770,248 B2 | 8/2004 | Haggett et al. | |
| 6,908,558 B2 * | 6/2005 | Stinson et al. | 101/483 |
| 7,048,863 B2 | 5/2006 | Swinnen et al. | |
| 7,291,277 B2 * | 11/2007 | Walczyk et al. | 210/787 |
| 2001/0002251 A1 | 5/2001 | Woodburn et al. | |
| 2002/0111569 A1 | 8/2002 | Rosenschein et al. | |
| 2003/0132165 A1 | 7/2003 | de Meulenaer et al. | |
| 2003/0136824 A1 | 7/2003 | Simon | |
| 2006/0144801 A1 | 7/2006 | Swinnen et al. | |

FOREIGN PATENT DOCUMENTS

| | | |
|---|---|---|
| DE | 44 30 587 | 2/1996 |
| DE | 19700164 | 7/1998 |
| EP | 0 577 871 | 1/1994 |
| EP | 0 633 049 | 9/1995 |
| EP | 0 680 779 | 11/1995 |
| EP | 0 515 346 | 2/1996 |
| EP | 0 661 090 | 6/1998 |
| EP | 0936187 | 8/1999 |
| EP | 1008556 | 6/2000 |
| EP | 1 080 943 | 3/2001 |
| GB | 1389291 | 4/1975 |
| JP | 5-8128113 | 7/1983 |
| JP | 5-228480 | 9/1993 |
| JP | 5-228481 | 9/1993 |
| JP | 5-228496 | 9/1993 |
| JP | 5-345192 | 12/1993 |
| JP | 7-155756 | 6/1995 |
| WO | WO 80/00226 | 2/1980 |
| WO | WO 93/13674 | 7/1993 |
| WO | WO 98/01394 | 1/1998 |
| WO | WO 98/05595 | 2/1998 |
| WO | WO 00/02821 | 1/2000 |
| WO | WO 2004/041314 | 5/2004 |
| WO | WO 2005/005322 | 1/2005 |

OTHER PUBLICATIONS

Ensiminger, "Ultrasonics, The low and high-intensity applications," Marcel Dekker, Inc., New York, pp. 70-73, (1973).

Miller, Douglas L., "Effects of a High-Amplitude 1-MHz Standing Ultrasonic Field on the Algae Hydrodictyon," IEEE Transaction on Ultrasonics, Ferroelectrics, and Frequency Control, vol. UFFC-33. No. 2, pp. 165-170, Mar. 1986.

Pétrier et al., "Sonochemical Degradation of Phenol in Dilute Aqueous Solutions: Comparison of the Reaction Rates at 20 and 487 kHz," J. Phys. Chem. vol. 98, No. 41, pp. 10514-10520 (1994).

Umemura et al., "Sonodynamic treatment by inducing microbubble reaction," J.E.M.U. vol. 19, No. 2/3, pp. 266-270 (1998).

Umemura, et al., "Mechanism of Cell Damage by Ultrasound in Combination with Hematoporphyrin," Jpn. J. Cancer Res., vol. 81, pp. 962-966, (Sep. 1990).

Vollmer, et al., "Bacterial stress responses to 1-Megahertz pulsed ultrasound in the presence of microbubbles," Applied and Environmental Microbiology, pp. 3927-3931, (Oct. 1998).

Yu et al., "A review of research into the uses of low level ultrasound in cancer therapy," Ultrasonics Sonochemistry, vol. 11, pp. 95-103 (2004).

Hua I et al., "Optimization of Ultrasonic Irradiation as an Advanced Oxidation Technology," Environ. Sci. Technol. vol. 31, No. 8, pp. 2237-2243, Aug. 1997.

Marmor, et al., "Tumor eradication and cell survival after localized hyperthermia induced by ultrasound," Cancer Research, vol. 39, pp. 2166-2171, (Jun. 1979).

Miller, et al., "Single strand DNA breaks in human leukocytes inducted by ultrasound in vitro," Ultrasound in Med. & Biol., vol. 15, No. 8, pp. 765-771, (1989).

Nyborg, W. L. and Ziskin, M. C. (Eds.), *Biological Effects of Ultrasound*, Churchill-Livingstone Inc., New York, pp. 23-33, (1985).

Phull, S. S. et al., "The Development and Evaluation of Ultrasound in the Biocidal Treatment of Water," Ultrasonics Sonochemistry, vol. 4, No. 2, pp. 157-164, Apr. 1997.

Wyllie, et al., "Apoptosis and the regulation of cell numbers in normal and neoplastic tissues: an overview," Cancer and Metastasis Reviews, vol. 11, pp. 95-103, (1992).

* cited by examiner

DEVICES AND PROCESSES FOR USE IN ULTRASOUND TREATMENT

RELATED APPLICATIONS

This application is a continuation-in-part of U.S. patent application Ser. No. 10/734,103, filed on Dec. 10, 2003, now U.S. Pat No. 7,048,863 which claims priority to Provisional Application No. 60/485,888, filed on Jul. 8, 2003. This application is also a continuation-in-part of PCT Application No. PCT/US2004/021664, filed on Jul. 7, 2004, now published as WO 2005/005322 A1. Each of the above-referenced applications is hereby incorporated by reference in its entirety.

FIELD

In specific embodiments, the present invention is directed to using high-frequency, low-energy ultrasound to treat cutting fluids. In other distinct embodiments, the present invention is directed to using high-frequency, low-energy ultrasound to treat fountain solutions.

BACKGROUND

The cutting of metals and other hard materials is often carried out with the use of a cutting tool to provide a desired shape, size or surface to the workpiece. When cutting these hard materials, frictional heat can burn the cutting tool and make the machined surface of the workpiece rough. Furthermore, thermal expansion lowers the accuracy of the shape and the size of the workpiece and the tool, thereby causing various other problems. To help alleviate the above problems, a cutting fluid is often employed during cutting.

Oils are commonly used as a cutting fluid when cutting metals and other hard materials. One disadvantage of using a straight oil as a cutting fluid is that it usually has to be used at low temperatures because high temperatures can cause the production of fire and smoke. To help overcome this problem, an oil-water emulsion cutting fluid having sufficient lubricity and cooling properties, can be used as a cutting fluid.

Unfortunately, cutting fluids, especially water-based cutting fluids, are susceptible to bacteria and other microbial propagation; Bacterial colonies often result in unpleasant odors, deterioration of the cutting fluid, and serious health hazards. In general, there are two types of bacteria that grow in cutting fluids: aerobic, which multiply in the presence of oxygen, and anaerobic, which propagate in the absence of oxygen. While the anaerobic types can result in unpleasant odors through the production of hydrogen sulfide, they typically do very little actual damage to cutting fluid itself. However, the aerobic type seriously degrades fluids, causing corrosion inhibition and loss of lubricity. Furthermore, the bacterial lifecycle while "eating" the fluid concentrate also results in the deposition of various acids and salts. This can cause extensive rusting/corrosion of both moving machine parts and the material being machined.

To prevent these accompanying problems, biocides have been added to cutting fluids. In practice however, these agents are of limited usefulness. In addition to costing more money, there are limits on the amount of biocide which can be incorporated into the cutting fluid. Furthermore, these agents are often ineffective, degrade over time, and replacing them can be expensive. In addition, these agents and substances often lower the quality of the cutting fluid.

Accordingly, there is a need in the art for an effective and new method of treating cutting fluids, that can provide uniform protection, or substantially uniform protection with time, without the use of large amounts of biocides.

Other distinct embodiments of the teachings herein pertain to the treatment of fountain solutions used in printing systems. In general, offset lithographic printing employs planographic plates which transfer ink via a blanket roll to a substrate thereby forming printed images. The plates are referred to as planographic because the image and non-image areas are in the same plane. The image areas, which accept ink, are distinguished from the non-image areas on the plate, by being oleophilic (having an affinity to oil), whereas the non-image areas are hydrophilic (water accepting).

Typically, a lithographic printing plate is covered with a thin film of fountain solution which prevents the ink from covering the plate in the non-image areas. More specifically, the fountain solution helps maintain the non-image areas of the printing plate, by increasing their hydrophilic nature.

Unfortunately, fountain solutions often provide a suitable medium for microorganisms to propagate. Unwanted microorganisms can include, bacteria, algae, mold, and the like, for example. To combat this problem, anti-microbial agents, or toxic biocides, can be added to the fountain solution.

While biocides added to fountain solution concentrates can afford protection to the product in storage and shipment, they are of limited usefulness after they have been diluted. Even in the diluted state, some of these biocides are skin sensitizers and higher dosages have been reported to cause skin sensitivity and other dermatological problems.

In order to avoid the toxic use of biocides, UV has been considered for the control of microorganisms in fountain solutions. Typical UV treatment involves killing microorganisms through lytic processes, wherein cell membranes and cellular components are decomposed. While UV light can function somewhat effectively in relatively clean water, when a solution is dirty or contains a number of compounds, the effectiveness of UV light decreases. This decrease in effectiveness generally occurs because these additional compounds in the solution absorb a significant amount of the UV energy. Furthermore, the use of UV rays can chemically or physically alter the fountain solution, such as to negatively effect its intended purpose.

Smith, in U.S. Pat. No. 6,503,449 discloses treating water-based suspensions with high-energy, low-frequency ultrasound. In addition to requiring high-energy, this process is dependent upon using toxic biocides to treat the suspensions.

Accordingly, there is a need in the art for an effective, low-energy, high-frequency method of treating fountain solutions without the use, or with limited use, of toxic biocides, and without compromising the effectiveness of the fountain solution. Furthermore, there is a need to provide a treatment that will provide microorganism control throughout the fountain solution system and in a manner which will provide substantially uniform protection with time.

DETAILED DESCRIPTION

Section I: Devices and Methods for Treating Cutting Fluids

The teachings herein are directed in part towards devices and methods which can neutralize, prevent the growth of, and remove microorganisms present in a cutting fluid. In further embodiments, the devices and methods provided herein can treat cutting fluids suspected of containing microorganisms, for example.

Cutting fluid degrades with time, based in part to microbial (e.g., bacterial) growth and contamination from the machining operation. When it becomes uneconomical to maintain the cutting fluid by regular make-up operations, the cutting fluid is typically disposed of. Accordingly, the embodiments herein encompass extending the useful life of cutting fluid by preventing degradation caused by microbes. In further embodiments, where the cutting fluid has degraded to a point where its utility has expired, the methods herein can be used to bring the cutting fluid to a safe level (neutralizing microbial propagation) prior to disposal (e.g., releasing the cutting fluid flow into a sewer system).

Devices and Methods

Figure 1:
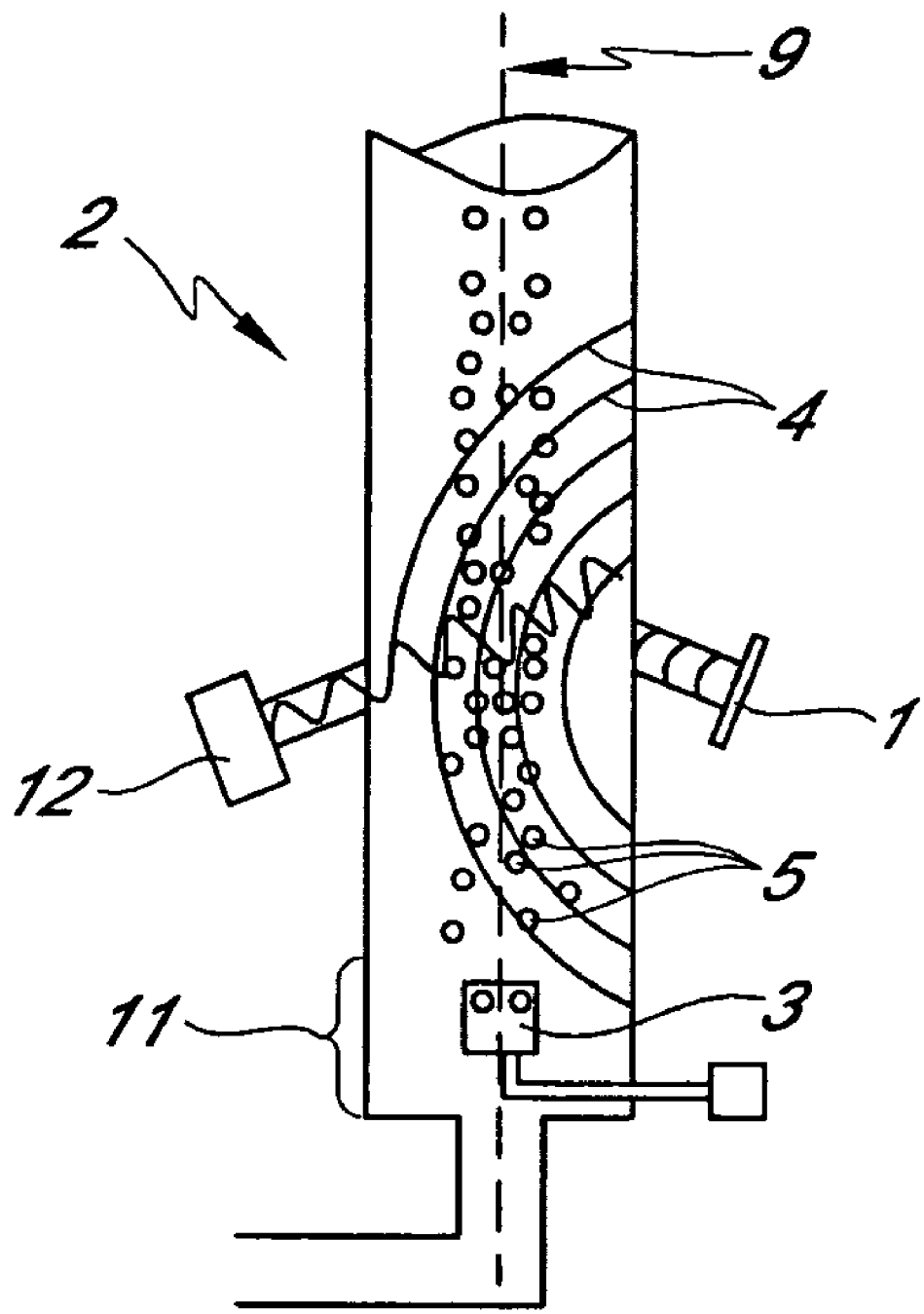
FIG. 1 is a drawing showing one embodiment of an ultrasound/microbubble device described herein.

Embodiments of the devices described herein can be found in U.S. application Ser. No. 10/358445 and U.S. Pat. No. 6,540,922 to Cordemans et al., both of which are expressly incorporated herein by reference in their entireties. Methods of treating cutting fluids can be performed with the devices disclosed herein. One particular embodiment of a device that can be used for treating cutting fluid is represented in FIG. 1. In certain embodiments, the cutting fluid to be treated can contain microorganisms, including bacteria, viruses, fungi, protists, and the like, for example.

Referring to FIG. 1, the devices described herein can include a compartment 2, preferably in the shape of a cylinder or a rectangular cross-section. In further embodiments the compartment 2 can be in communication with a reservoir (not shown) which holds the cutting fluid to be treated. The term "reservoir" is to be construed broadly, and generally relates to an apparatus containing cutting fluid. In specific embodiments the devices provided herein are connected (e.g., via a side stream) through the sump to the recirculating cutting fluid. In further embodiments, the devices provided herein are not in communication with a reservoir and are directly connected to the cutting fluid to be treated.

In further embodiments, the compartment 2 contains (e.g., along its wall) one or more high-frequency ultrasound emitters 1 that emit ultrasound 4 into the compartment 2 (preferably into the center of this compartment 2). In other embodiments the container can also have one or more microbubble emitters 3 for emitting gas microbubbles 5, which are arranged so as to emit the gas microbubbles 5 into the ultrasound 4 field emitted in the compartment 2.

The term "microbubbles," as used herein is intended to refer to gas bubbles with an average diameter of less than 1 mm. In some embodiments the diameter is less than or equal to 50 μm. Still in other embodiments the microbubbles have a diameter less than about 30 μm. In certain embodiments the microbubbles are selected from air, oxygen, and ozone microbubbles. To lower operating costs, it can be advantageous to use microbubbles that are not ozone microbubbles, such as air microbubbles.

The term "microorganisms" is synonymous with microbes and generally relates to pathogenic or non-pathogenic microorganisms which can give rise to harmful effects to cutting instruments (e.g., machinery, tools, etc.), man, mammals or any other animal. Such microorganisms can include both aerobic and anaerobic bacteria (e.g., *Yersinia, Staphylococcus, E. coli, Pseudomonas aeruginosa, Pseudomonas oleovorans, Paracolobactrum, Proteus vulgaris, Klebsiella pneumoniae, Micrococcus pyogenes, Aerobacter aerogenes, Citrobacter, Achromobacter*), viruses (e.g., HIV, HCV, HBV), fungi (e.g., *Fusarium, Cephalosporium, Cladosporium, Aspergillus*), protists (e.g., mold, algae), and the like, for example.

In specific embodiments, the methods and devices herein include low energy, high-frequency ultrasound to treat a cutting fluid. The term "high frequency" is intended to refer to frequencies higher than 200 kHz and up to several MHz. In certain embodiments, the high frequencies used are between 200 kHz and 10 MHz. In still other aspects, the high-frequencies can be between 200 kHz and 20 MHz. In various other embodiments, the high-frequencies can be between 800 kHz (where less radical effects and more biological effects are reached) and 5 MHz. In another embodiment, the frequency used is between 1 MHz and 3 MHz. More specifically, the frequency can be about 1.8 MHz.

In various embodiments of the methods and devices described herein, the microbubble emitter 3 for emitting gas microbubbles 5 is arranged at the base 11 of the compartment 2, (i.e., at the bottom of the compartment 2), such that the microbubbles move by rising naturally or by entrainment of the gas in the flow of the cutting fluid.

In still further embodiments, the devices and methods provided herein, neutralize, treat or prevent the growth of microorganisms in a cutting fluid. Although the present teachings are in no way to be limited by their precise mechanism of action, in more specific embodiments the devices provided herein can produce radicals such as H., .OH and HOO.. These radicals can also form $H_2O_2$, which along with the radicals, is toxic to microorganisms and can bring about their inactivation and/or destruction.

The species created are thought to be derived from the reactions of high-frequency ultrasound on the water molecule, most likely giving rise (in particular in the presence of oxygen) to the following reactions:

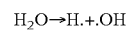

$H_2O \rightarrow H. + .OH$

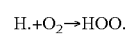

$H. + O_2 \rightarrow HOO.$

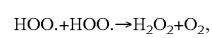

$HOO. + HOO. \rightarrow H_2O_2 + O_2,$

$.OH + .OH \rightarrow H_2O_2$

Advantageously, the energy required to produce these toxic species is reduced if the process is performed in the presence of microbubbles, as described herein.

It has been recently appreciated that the injection of microbubbles into the ultrasound field gives rise to an increase in the phenomenon of sonoluminescence, by superposition of the microbubbles onto the cavitation bubbles induced by the ultrasound, the number of excited and toxic species can be multiplied. This phenomenon is observed on a macroscopic level when the ultrasound treatment is synergistically combined with the presence of microbubbles of suitable size.

In additional embodiments, the devices and methods provided herein have the advantage that there is no need to devote the ultrasound to specific zones, since it is observed that the treatment system functions by diffusing the products formed in situ (for example, ROS (reactive oxygen species), radicals and $H_2O_2$ formed) towards the reservoir of the cutting fluid to be treated.

In further embodiments, the one or more ultrasound emitters 1 in the devices described herein are oriented so as not to give rise to practically any standing-wave phenomena. For example, in certain embodiments, one or more ultrasound emitters 1 can be oriented obliquely relative to the axis 9 of the compartment 2 (acute angle not perpendicular to this axis 9) and relative to the flow of cutting fluid and to the flow of microbubbles 5 (see FIG. 1). This characteristic makes it possible for all the microbubbles 5 in the compartment 2 to be treated in a statistically identical manner, without creating stationary zones in the said compartment 2. Accordingly, certain embodiments herein are directed to devices and methods that provide uniform treatment, or substantially uniform treatment, and protection over time.

According to other embodiments, the devices and methods described herein can include a light emitter 12 (i.e. an electromagnetic radiation emitter) which emits into the compartment 2 in the ultrasound 4 field, radiation, with a frequency that is mostly in the visible range. However, for certain applications, in order to remove certain specific microorganisms, it can be advantageous to emit electromagnetic radiation with a frequency that is mostly non-visible, as ultraviolet radiation (e.g., UVA, UVB or UVC type), infrared, laser, microwaves, and the like, for example.

It has recently been discovered, unexpectedly, that a treatment comprising the emission of microbubbles into the fields combined with ultrasound and light radiation is particularly effective at inactivating and removing microorganisms present in a cutting fluid, and preventing their growth. The phenomenon of sonoluminescence can promote the production of extremely active oxygenated species (often referenced as ROS (reactive oxygen species) such as the superoxide radical, .OH, or singlet oxygen, which can result in a series of biochemical reactions that are extremely toxic for certain microorganisms.

In various embodiments, the teachings herein are directed towards devices which do not require additional chemical products (e.g., biocides, photosensitizers) to neutralize or prevent the growth of microorganisms from a cutting fluid. In other embodiments the methods and devices herein can be used in conjunction with additional chemical agents.

In other embodiments, the devices and methods described herein can include a pump or other devices for recirculating the cutting fluid, as well as devices for recovering the microorganisms present in the cutting fluid. Examples of devices for recovering the microorganisms, non-exclusively include apparatuses for filtration, centrifugation, and precipitation (such as cyclones, and the like). In certain embodiments, the pump and/or devices for recovery are arranged between the reservoir containing the cutting fluid, to be treated and the compartment 2.

Figure 2:
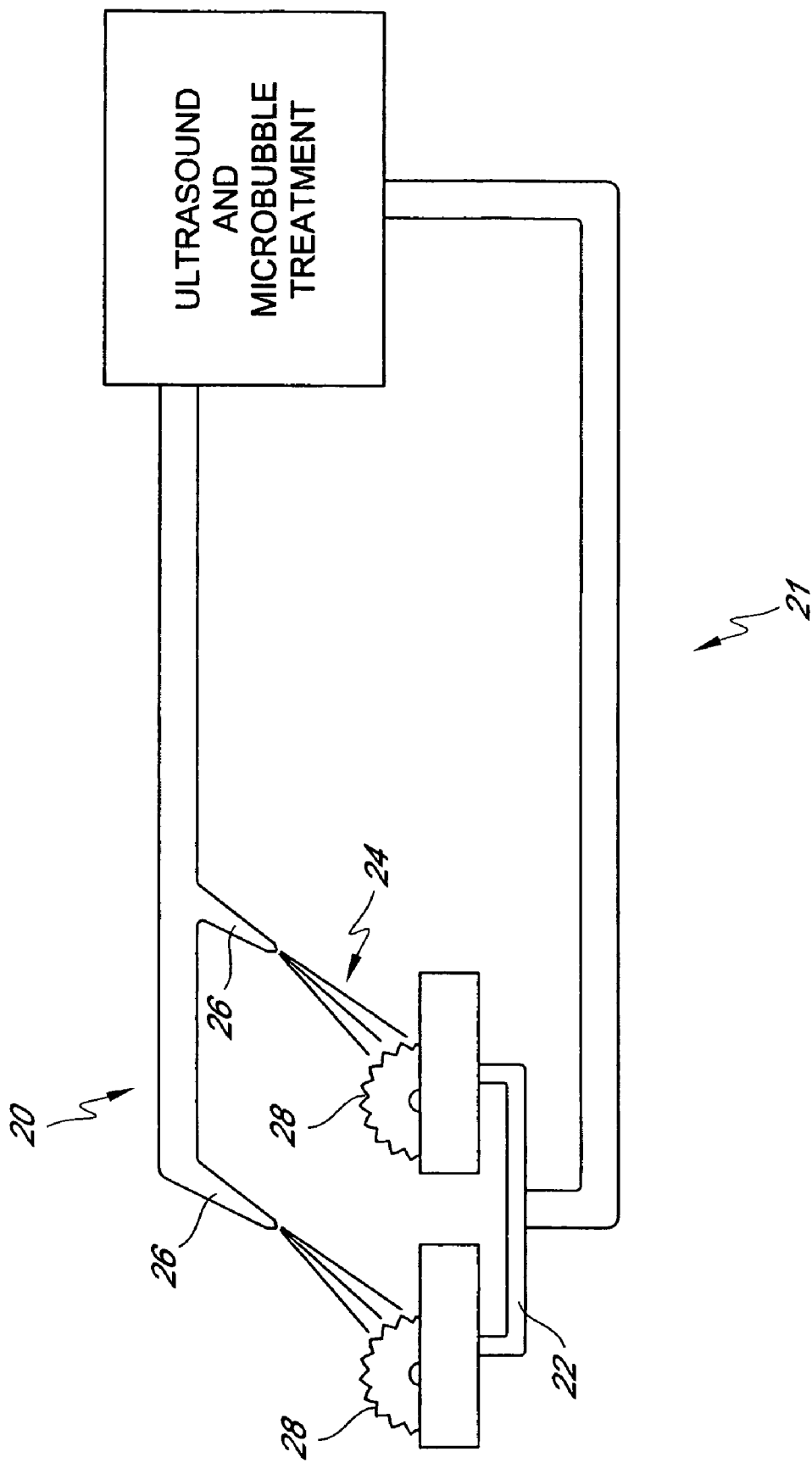
FIG. 2 is a drawing showing a recirculating cutting fluid system comprising a ultrasound/microbubble device connected to a cutting fluid distributor and a cutting fluid collection device.

In certain embodiments, the devices provided herein can be connected to a cutting fluid distributor and/or cutting fluid collection system (e.g., a trench or sump). For example, FIG. 2 represents a recirculating cutting fluid system 21 comprising a ultrasound/microbubble treatment device connected to a cutting fluid distributor 20 and a cutting fluid collection device 22. In further embodiments, the cutting fluid to be treated may be applied either manually to the cutting zone 24 of the tool, or delivered in a mist. In specific embodiments, the cutting fluid is distributed in a continuous stream, delivered by a pump and directed through a nozzle 26 to the cutting edge 28 of the machine tool or through the tool and over the work to carry away the work material chips or swarf. In other embodiments, a variety of fluid nozzle designs can be used depending on the specific application needed. In still further embodiments, a distribution system 20 can be used to control the cutting fluid flow volume and flow pressure. In other embodiments, the cutting fluid can be in a recirculating system 21. Non-exclusive examples of cutting fluid distributors that can be used with the devices herein are disclosed in U.S. Pat. No. 6,450,738, to Ripley, and U.S. Pat. No. 4,514,149, to Kanebako et al., both of which are hereby expressly incorporated by reference in their entireties.

In further embodiments, the cutting fluid can be collected through gravity flow, velocity flow, or trenches (e.g., conveyorized trenches). In specific embodiments, after the cutting fluid is collected, it can be treated according to the methods provided herein and recirculated to the cutting zone of the machine tool. In other embodiments, the cutting fluid is not collected, and travels directly from the cutting zone to the devices provided herein, for treatment. A non-exclusive example of a cutting fluid collection system that can be used with the devices and methods herein is disclosed in U.S. Pat. No. 5,593,596, to Bratten, which is hereby expressly incorporated by reference in its entirety. In still further aspects, the devices and methods herein can be used with any suitable cutting fluid monitoring and/or control system, such as those disclosed in U.S. Pat. No. 5,224,051, to Johnson, for example, which is hereby expressly incorporated by reference in its entirety.

The methods and devices herein can be used to treat practically any type of cutting fluid used with any suitable instrument (e.g., machine) capable of cutting or manipulating hard materials, such as metals, and the like, for example. The term "cutting" is to be construed broadly, and encompasses all types of hard material (e.g., metal) manipulations. In certain embodiments, the term "cutting" can relate to planing, boring, broaching, counter-boring, forming, threading, shaping, hole extruding, milling, sawing, drilling, spot facing, tapping, hobbing, drawing, engraving, piercing, internal breaching, reaming, punching (e.g., using a punch press), roll forming, seat forming, stamping, turning, diamond wafering, and the like, for example. Accordingly, the methods and devices herein can be used with any suitable instrument or machine that is capable of the above listed functions, or like functions. For example, suitable instruments and machines include: milling cutters, broaching machines, boring machines, counter-boring machines, forming machines, boring mills, saws (e.g., circular and band), grinders (e.g., belt and wheel), drilling machines, punch presses, and the like.

Figure 4:
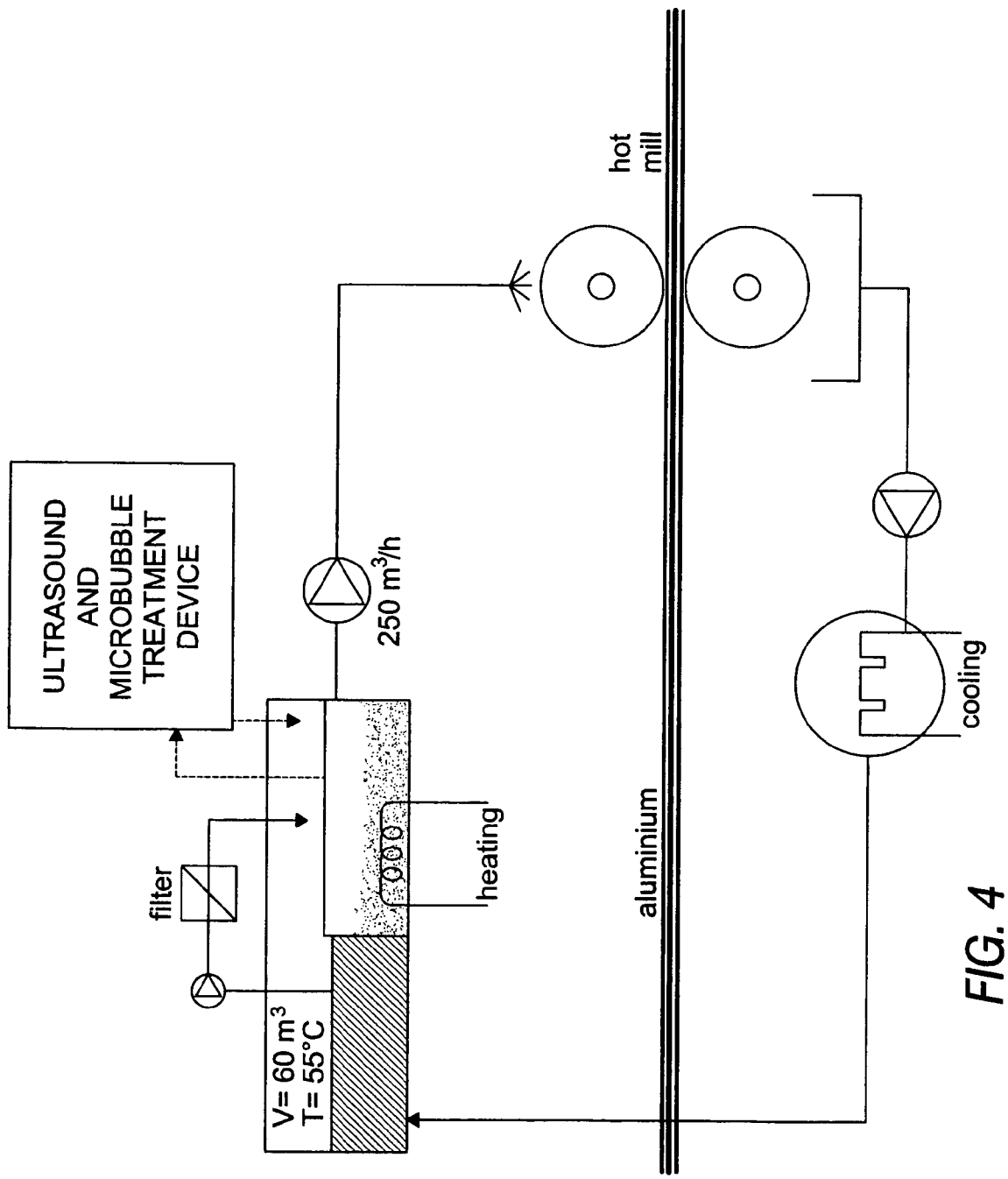
FIG. 4 is a drawing showing a recirculating roll forming system comprising a ultrasound/microbubble device.

In some particular embodiments, as mentioned above and shown in one embodiment in FIG. 4, the methods and devices described herein can be used to treat fluids used in roll forming systems, such as rolling oil emulsions. In more specific embodiments the teachings herein can be used to treat rolling oil emulsions used in aluminum rolling. Treating rolling oil emulsions with the methods and devices herein do not deteriorate the lubricity characteristics or pH of the fluid. Furthermore, the teachings herein prevent foul odors from developing, and prevent biological waste from blocking filters within the system. In preferred embodiments, the methods and devices herein can treat rolling oil emulsions at temperatures between 35° C.-60° C.

In certain embodiments, the methods and devices provided herein can treat each cutting fluid used by a particular cutting instrument, regardless of whether the cutting instrument is using one or more types of cutting fluids, or is connected to one or more cutting fluids reservoirs.

The methods and devices herein can be used to treat any suitable type of cutting fluid currently available or that will be available in the future. The term "cutting fluid" is to be construed broadly and generally relates to fluids used as a lubricant, cooling agent, anti-welding agent, or corrosion inhibitor in cutting hard materials, such as metal, and the like, for example. In certain embodiments the term "cutting fluid" encompasses metal working fluid (MWF). In other embodiments, the term "cutting fluid" encompasses fluid used to treat, manipulate or cut other hard materials, such as: glass, ceramics, carbides, minerals, earthenware, diamonds and other precious stones, plastics, and the like, for example.

Based on the above-mentioned functions, cutting fluids can lead to longer tool life, reduced thermal deformation of workpiece, a better surface finish, and ease of chip and swarf handling, and the like, for example.

Practically any cutting fluid, including any of the following three general categories of cutting fluids, can be used with the devices and methods described herein: soluble-oils, semisynthetic fluids, and synthetic fluids.

In certain embodiments, the methods and devices herein can be used to treat synthetic cutting fluids. Synthetic fluids generally contain no petroleum or mineral oil base and instead are formulated from alkaline inorganic and organic compounds. Synthetic cutting fluids can include synthesized hydrocarbons, organic esters, polyglycols, phosphate esters, organic or inorganic salts, and other synthetic lubricating fluids. In addition, synthetic cutting fluids can include additives, such as agents that inhibit corrosion. Synthetic fluids are often used in a diluted form. For example, each part of synthetic concentrate can be diluted with about 9-41, 10-40, 11-40, 11-39, 10-35, and 10-30 parts water. Synthetic fluids often provide the best cooling performance among all cutting fluids, but generally do not provide optimal lubrication.

In still further embodiments, the methods and devices herein can be used to treat soluble-oil cutting fluids. Although used throughout the industry, the term "soluble-oil," is typically a misnomer because the constituents are generally not soluble in water. Soluble-oils are generally oils (e.g., mineral and petroleum) blended with emulsifiers and/or other additives which, when added to water and stirred, form an oil-in-water emulsion. The emulsion allows the good cooling properties of water to be utilized in the metal working process while the oil and any other additives can provide lubrication and corrosion inhibiting properties, for example. Usually, the concentrate includes a base mineral oil and one or more emulsifiers to help produce a stable emulsion. Superfatted emulsions are typically produced by the addition of fatty oils, fatty acids, or esters. Extreme pressure emulsions can include additives such as chlorine, chlorinated paraffins, sulfur, phosphorus, and the like, for example.

Typically, soluble-oil cutting fluids provide good lubrication and heat transfer performance. Furthermore, soluble-oil cutting fluids are widely used in industry and are usually the least expensive among all cutting fluids. Soluble-oil cutting fluids are also known as water-based oils, water-based soluble oils, water-based emulsifying oils, emulsifying oils, water-soluble oils, and the like.

Oils are typically diluted in soluble-oil cutting fluids. For example, in certain embodiments, the oil can constitute about 3%, 4%, 5%, 6%, 7%, 8%, 9%, or 10% of the cutting fluid. In certain embodiments, the water used in soluble-oil cutting fluids is deionized or softened. In other embodiments, the water used can include about 70-140, 80-125, or 90-115 ppm of calcium carbonate.

In other embodiments, the methods and devices herein can be used to treat semi-synthetic cutting fluids. Semi-synthetic cutting fluids generally relate to a combination of synthetic and soluble-oil fluids and have characteristics common to both types. The cost and heat transfer performance of semi-synthetic fluids typically lie between those of synthetic and soluble-oil fluids.

Depending on the specific type of cutting fluid to be treated with the methods herein, the cutting fluid can contain water, oil, and one or more emulsifiers, chelating agents, coupling agents, viscosity index improvers, detergents, plasticizers, anti-mist agents, anti-weld agents, oiliness agents, surfactant wetting agents, dispersants, passivators, anti-foaming agents, alkaline reserves, dyes, odorants, corrosion inhibitors, extreme pressure additives, lubricity enhancers, cleaners, tapping compounds, fingerprint neutralizers, or any other suitable additive, for example.

In some embodiments, the devices and methods provided herein can be used in conjunction with anti-microbial agents such as a amine, amide, phenyl, guanidine, prochloraz, propiconazole, iodocarb, sodium hypobromite, 5-Chloro-2-methyl 4-isothiazolin-3-one, 2-methyl-4-isothiazolin-3-one, 3-Isothiazolone (which can be stabilized with antimony salts), Tris(hydroxymethyl)nitromethane, Hexahydro-1,3,5-tris(2-hydroxyethyl)-S-triazine, Hexahydro-1,3,5-triethyl-S-triazine, 1-(3-Chloroallyl)-3,5,7-triaza-1-azonia adamantane chloride, 4-(2-Nitrobutyl)morpholine-4,4'-(2-ethyl-2-nitrotrimethylene) dimorpholine, O-Phenyl phenol, Sodium 2-pyridinethiol-1-oxide, 1,2-BIT, 6-Acetoxy-2,4-dimethyl-m-dioxane, 2,2-Dibromo-3-nitrilopropionamide, p-Chloro-m-xylenol, and the like. Non-exclusive examples of microbiocides are also provided in U.S. Pat. No. 6,342,522, to Mason et al., U.S. Pat. No. 6,322,749, to McCarthy et al., U.S. Pat. No. 5,416,210, to Sherba et al., U.S. Pat. Nos. 4,975,109 and 5,256,182, to Friedman, Jr. et al., U.S. Pat. No. 5,145,981, to Willingham, U.S. Pat. No. 4,294,853, to Williams et al., all of which are expressly incorporated by reference in their entireties.

While in some embodiments the methods and devices herein can be used with microbiocides, such as those described above, it is important to note that the effectiveness of the provided methods and devices in treating, preventing the growth of or neutralizing microorganisms is not dependent on additional chemicals (e.g., biocides). Accordingly, the methods and devices described herein can be used without anti-microbial agents.

Examples of cutting fluids that the methods and devices herein can treat, include, but are not limited to the cutting fluids disclosed in U.S. Pat. Nos. 6,518,225 and 6,242,391, to Fukutani et al., U.S. Pat. No. 5,534,172, to Perry et al., U.S. Pat. No. 6,221,814, to Kaburagi et al., U.S. Pat. No. 4,605,507, to Windgassen et al., U.S. Pat. No. 6,258,759, to Futahashi, et al., and U.S. Pat. No. 5,616,544, to Kalota, et al., all of which are expressly incorporated herein by reference in their entireties.

Cutting fluids can be used in cutting or manipulating any suitable hard material. In certain embodiments, the cutting fluid to be treated by the methods herein can be used (e.g., as a coolant or lubricant) in the cutting of any suitable type of metal workpiece. In specific embodiments the workpiece can be or include: carbon, alloy and tool steel, stainless steel, titanium and other high-temperature alloys, grey and ductile cast irons, aluminum and aluminum alloys, non-ferrous materials, magnesium, copper and copper alloy, bronze, brass, carbon steels, stainless steels, chrome-moly steels, vanadium, titanium, nitalloy, inconel, monel, berylium copper, boron carbide, and the like, for example.

In other embodiments the cutting fluid to be treated by the methods and devices described herein can be used in the cutting and manipulation of hard materials, besides metals, including, but not limited to: glass, ceramics, carbides, minerals, earthenware, diamonds and other precious stones, plastics, and the like, for example.

In further embodiments, the devices and methods herein can be used in conjunction with one or more other methods that prevent microbial propagation including: centrifuging, filtering, aerating, cleaning the sump, maintaining proper concentration of cutting fluid, removing surface tramp oil, and adding biocides, for example. Accordingly, in certain embodiments, the devices and methods herein relate to applying high-frequency ultrasound either before, after, or during one or more the above-mentioned treatment methods, or other anti-microbial treatments.

Section II: Devices and Methods for Treating Fountain Solutions

In separate embodiments, the teachings herein provide devices and methods for treating fountain solutions used in printing systems. Offset printing is a process which is based on the principle that an image area (also known as the printing area) of a printing plate accepts ink while a non-image area (also known as the non-printing area or the background) repels ink. Using offset printing, the ink-coated image is ultimately transferred to a substrate, such as paper, producing an image corresponding to the image on the plate.

In general, the term "fountain solution," also known as "dampening fluid," relates to a solution that is applied to the surface of the printing plate in order to cause the non-image area of the plate to repel ink while allowing the image area to accept ink. Fountain solutions can also be used to quickly clean ink off the non-image area during press starts, promote fast spreading of water over the plate surface, help water flow evenly through the dampening rollers, lubricate the plate and blanket, or control emulsification of ink and water, and the like.

Figure 3:
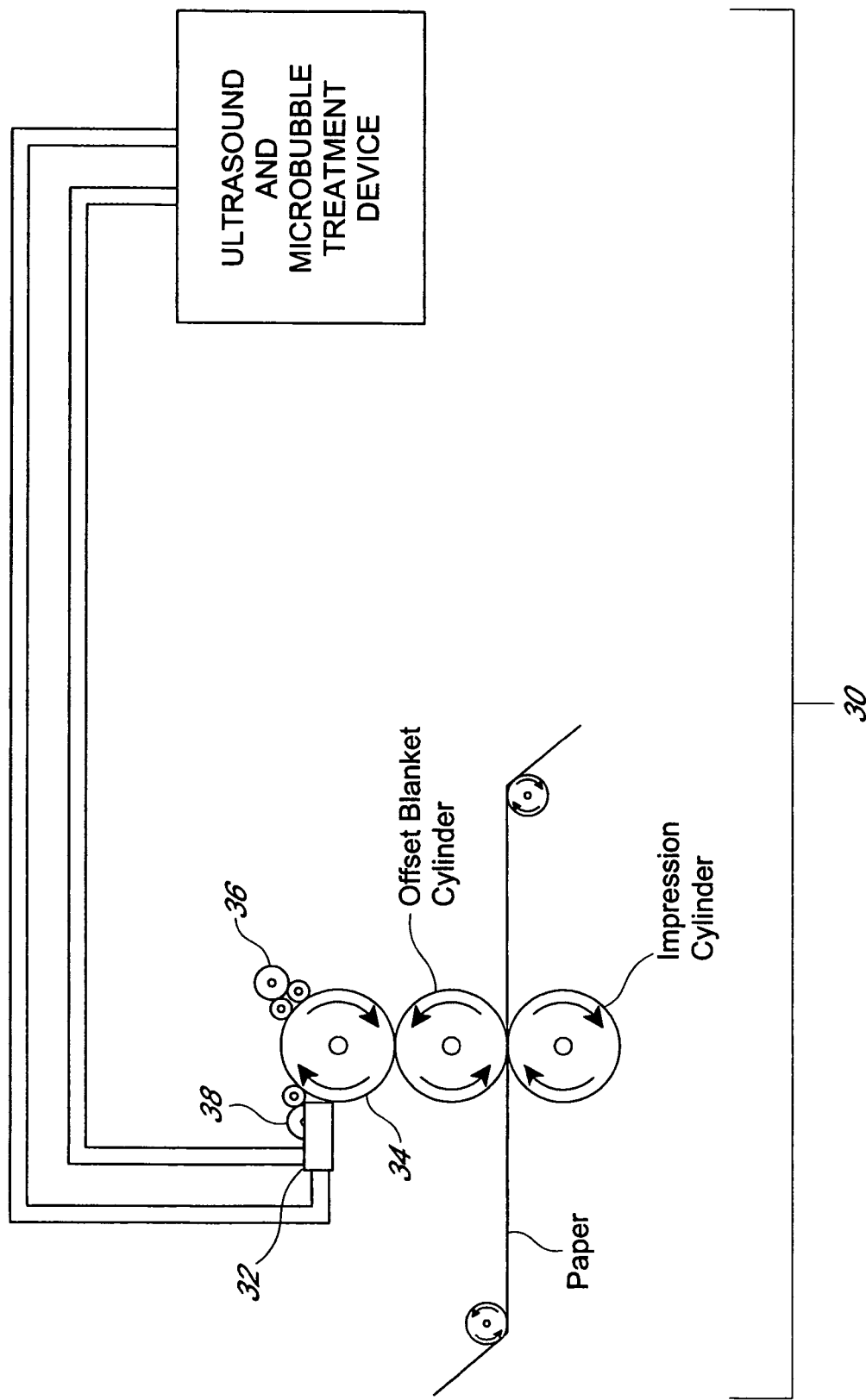
FIG. 3 is a drawing showing a recirculating fountain solution system comprising a ultrasound/microbubble device connected to a printing apparatus.

With reference to FIG. 3, fountain solution within the printing system is typically collected in one or more fountain solution reservoirs, commonly called trays 32. In general, one or more rollers 38 positioned in a tray 32 can transfer the fountain solution from the tray 32 to a print plate 34. After fountain solution is transferred to the printing plate 34, ink rollers 36 transfer ink to the printing plate 34. A circulation system 30 is often used to recirculate fountain solution from a fountain solution outlet of the tray(s) 32 to a sump and back through a fountain solution inlet to the tray(s) of the printing system. A common way of driving the fountain solution from the fountain solution trays to the sump is by gravity feed or gravity-assisted feed, while a pump returns the fountain solution from the sump back to the fountain solution trays of the printing system.

A common problem for fountain solutions is that they degrade with time, based in part to microbial growth and contamination from the machining operation. When it becomes uneconomical to maintain the fountain solution by regular make-up operations, the fountain solution is typically disposed of.

Accordingly, the teachings herein are in part directed towards devices and methods which can neutralize, prevent the growth of, and remove microorganisms in a fountain solution. More specifically, the embodiments herein include extending the useful life of a fountain solution by preventing degradation caused by microorganisms. In further embodiments, where the fountain solution has degraded to a point where its utility has expired, the methods herein can be used to bring the fountain solution to a safe level (neutralizing microbial propagation) prior to disposal.

Methods and Devices

Embodiments of the devices provided herein can be found in U.S. application Ser. No. 10/358445 and U.S. Pat. No. 6,540,922 to Cordemans et al., both of which are expressly incorporated herein by reference in their entireties. Methods of treating fountain solutions can be performed with the devices disclosed herein. One particular embodiment of a device that can be used for treating fountain solution is represented in FIG. 1. In certain embodiments, the fountain solution to be treated can contain microorganisms, including bacteria, viruses, fungi, protists, and the like, for example.

Referring to FIG. 1, the devices described herein can include a compartment 2, preferably in the shape of a cylinder or a rectangular cross-section. In further embodiments the compartment 2 can be in communication with a reservoir (not shown) which holds the fountain solution to be treated. The term "reservoir" is to be construed broadly, and generally relates to an apparatus containing fountain solution. In specific embodiments the devices provided herein are connected to (e.g., via a side stream) to a fountain solution distribution, supplying, collecting, mixing, or circulating system. In further embodiments, the devices provided herein are not in communication with a reservoir, but are directly connected to the fountain solution to be treated.

In other embodiments, the compartment 2 contains (e.g., along its wall) one or more high-frequency ultrasound emitters 1 that emit ultrasound 4 into the compartment 2, preferably into the center of the compartment 2. In other embodiments, the container can also have one or more gas microbubble emitters 3 for emitting gas microbubbles 5, which are arranged so as to emit the gas microbubbles 5 into the ultrasound 4 field emitted in the compartment 2.

The term "microbubbles," as used herein is intended to refer to gas bubbles with an average diameter of less than 1 mm. In some embodiments, the diameter is less than or equal to 50 µm. Still in other embodiments, the microbubbles have a diameter less than about 30 µm. In certain embodiments, the microbubbles are selected from air, oxygen, and ozone microbubbles. To lower operating costs, it can be advantageous to use microbubbles that are not ozone microbubbles, such as air microbubbles.

The term "microorganism," is synonymous with "microbe", and generally relates to any pathogenic or non-pathogenic microorganism which can give rise to harmful effects to the printing system (e.g., fountain solution, printing plates, machines, instruments), man, mammals or any other animal. Such microorganisms can include both aerobic and anaerobic bacteria (e.g., *Yersinia, Staphylococcus, E. coli, Pseudomonas aeruginosa, Pseudomonas oleovorans, Paracolobactrum, Proteus vulgaris, Klebsiella pneumoniae, Micrococcus pyogenes, Aerobacter aerogenes, Citrobacter, Achromobacter*), viruses (e.g., HIV, HCV, HBV), fungi (e.g. *Fusarium, Cephalosporium, Cladosporium, Aspergillus*), protists (e.g., mold), and the like.

In specific embodiments, the methods and devices herein include low energy, high-frequency ultrasound to treat a fountain solution. The term "high frequency" is intended to refer to frequencies higher than 200 kHz and up to several MHz. In certain embodiments, the high frequencies used are between 200 kHz and 10 MHz. In still other aspects, the high-frequencies can be between 200 kHz and 20 MHz. In various other embodiments, the high-frequencies can be between 800 kHz (where less radical effects and more biological effects are reached) and 5 MHz. In another embodiment, the frequency used is between 1 MHz and 3 MHz. More specifically, the frequency can be about 1.8 MHz.

In various embodiments of the methods and devices described herein, the gas microbubble emitter 3 for emitting gas microbubbles 5 is arranged at the base 11 of the compartment 2, (i.e., at the bottom of the compartment 2), such that the microbubbles move by rising naturally or by entrainment of the gas in the flow of the fountain solution.

In still further embodiments, the devices and methods described herein can neutralize, treat or prevent the growth of microorganisms in a fountain solution. Although the present teachings are in no way to be limited by their precise mechanism of action, in more specific embodiments the devices provided herein can produce radicals such as ROO., H., .OH and HOO. which can also form $H_2O_2$. This molecule and/or these radicals being toxic to microorganisms and thus bring about their inactivation and/or destruction.

The species created are thought to be derived from the reactions of high-frequency ultrasound on the water molecule, most likely giving rise (in particular in the presence of oxygen) to the following reactions:

$$H_2O \rightarrow H. + .OH$$

$$H. + O_2 \rightarrow HOO.$$

$$HOO. + HOO. \rightarrow H_2O_2 + O_2,$$

$$.OH + .OH \rightarrow H_2O_2$$

Advantageously, the energy utilized to produce these toxic species is reduced if the process if performed in the presence of microbubbles, as described herein.

It has been recently appreciated that the injection of microbubbles into the ultrasound field gives rise to an increase in the phenomenon of sonoluminescence, by superposition of the microbubbles onto the cavitation bubbles induced by the ultrasound, the number of excited and toxic species can be multiplied. This phenomenon is observed on a macroscopic level when the ultrasound treatment is synergistically combined with the presence of microbubbles of suitable size.

In additional embodiments, the devices and methods provided herein have the advantage that there is no need to devote the ultrasound to specific zones, since it is observed that the treatment system functions by diffusing the products formed in situ (e.g., ROS (reactive oxygen species), radicals and $H_2O_2$) towards the reservoir of fountain solution to be treated.

In further embodiments, the one or more ultrasound emitters 1 in the devices described herein are oriented so as not to give rise to any standing-wave phenomena. For example, in certain embodiments, one or more ultrasound emitters can be oriented obliquely relative to the axis 9 of the compartment 2 (acute angle not perpendicular to this axis 9) and relative to the flow of fountain solution and to the flow of microbubbles 5 (see FIG. 1). This characteristic makes it possible for practically all the microbubbles 5 in the compartment 2 to be treated in a statistically identical manner, without creating stationary zones in the said compartment 2. Accordingly, certain embodiments herein are directed to devices and methods that provide substantially uniform treatment and protection over time.

According to other embodiments, the devices and methods described herein can include a light emitter 12 (i.e. an electromagnetic radiation emitter) which emits into the compartment 2 in the ultrasound 4 field, radiation, with a frequency that is mostly in the visible range. However, for certain applications, in order to remove certain specific microorganisms, it can be advantageous to emit electromagnetic radiation with a frequency that is mostly non-visible, as ultraviolet radiation (e.g., UVA, UVB or UVC type), infrared, laser, microwaves, and the like, for example.

It has recently been discovered, unexpectedly, that a treatment comprising the emission of microbubbles into a field, combined with ultrasound and light radiation is particularly effective at inactivating and removing microorganisms present in a fountain solution. The phenomenon of sonoluminescence can promote the production of extremely active oxygenated species (often referenced as ROS: reactive oxygen species) such as the superoxide radical, .OH, or singlet oxygen, which can result in a series of biochemical reactions that are extremely toxic for certain microorganisms.

In various embodiments, the teachings herein are directed towards devices which do not require additional chemical products (e.g., biocides, photosensitizers) to neutralize or prevent the growth of microorganisms, from a fountain solution. In other embodiments, the devices herein can be used to neutralize, or prevent the growth of microorganisms in a fountain solution, with a limited amount of chemical products (e.g., biocides, photosensitizers). The term "limited amount" relates to solutions containing less than 5 ppm of biocide. For example, a limited amount of biocide can include about 4.9, 4.5, 4.0, 3.0, 2.0, 1.0, and 0 ppm, and any value or range of values between these values. The term "biocide" is to be construed broadly, and generally relates to any suitable agent that is capable of preventing or stopping the growth of microorganisms, including bacteria, mold, algae, fungus, viruses, protists, and the like, for example.

In other embodiments, the devices and methods described herein can include a pump or other devices for recirculating the fountain solution, as well as devices for recovering the microorganisms present in the fountain solution. Examples of devices for recovering, non-exclusively include apparatuses for filtration, centrifugation, and precipitation (such as cyclones, and the like). In certain embodiments, the pump and/or device for recovery are arranged between the reservoir containing the fountain solution, to be treated and the compartment 2.

In certain embodiments, the devices and methods provided herein can be connected to a practically any fountain solution distribution, mixing, collection, supply, or circulating system. In more specific embodiments, the devices herein can be connected to the fountain solution systems disclosed in U.S. Pat. No. 6,508,069, to Sibilia, U.S. Pat. No. 5,713,282 to MacPhee, U.S. Pat. No. 5,619,920, to MacPhee, U.S. Pat. No. 4,969,480, to Hughes, U.S. Pat. No. 4,754,779, to Juhasz, U.S. Pat. No. 4,523,854, to Beckley, U.S. Pat. No. 4,394,870, to MacPhee et al., and U.S. Pat. No. 4,151,854 to Patsko, for example. The above patents are expressly incorporated herein by reference in their entireties.

New environmental awareness as well as stringent disposal codes have created the need for a system to treat recirculating fountain solution so that it is maintained relatively contaminant free. For example, in many localities the spent fountain solution is classified as hazardous waste. The practice of frequently discarding and replacing the solution has therefore become cost prohibitive. Accordingly, in further embodiments, in addition to treating fountain solution prior to reuse, the methods and devices herein can be used to make the fountain solution suitable for discarding, such as to satisfy governing disposal regulations, for example.

Typically, fountain solutions primarily comprise water and additional substances. In general, additional substances are added to the fountain solution depending on the specific intended use of the fountain solution. Accordingly, further embodiments include methods of treating fountain solutions containing agents that regulate the pH, ensure compatibility with the printing ink, or keep the printing plate moist. In still further embodiments, the methods herein can treat fountain solutions containing one or more of the following agents: chelate formers, solvents, preservatives (including biocides), surfactants, corrosion inhibitors (e.g., zinc nitrate, magnesium nitrate, aluminum nitrate), defoamers, dyes, viscosity control agents, emulsion control agents, non-piling agents (e.g., glycols), de-sensitizing salts (e.g., silicates, phosphates), water soluble gums (e.g., gum arabic, larch gum, starches, CMC, PVP, and acrylics), or lubricants (e.g., alcohol, alcohol substitutes, polymers, and glycols), and the like.

Typical biocides that can be can be used in limited amounts with the methods described herein, include Bromopol [1,3-propanediol, 2-bromo-2-nitro], various isothiazolones, glutaraldehyde, sodium benzoate, phenol, 6-acetoxy-2,4-dimethyl-m-dioxane, 1,2-benziso-thiazolin-3-one, 2-[(hydroxymethyl) amino]ethanol, formaldehyde, quaternary ammonium salt of the trialkyl benzyl type, and the like.

In more specific embodiments, the methods and devices provided herein can be used to treat fountain solution used in practically any type of offset printing, or printing that is based on water and oil being immiscible. In even more specific embodiments, the methods and devices herein can be used to treat fountain solution used in practically any lithographic printing system.

Examples of fountain solutions that the methods and devices herein can treat, include, but are not limited to the fountain solutions disclosed in U.S. Pat. No. 5,897,693, to Whitehead, U.S. Pat. No. 5,720,800, to Matsumoto, U.S. Pat. No. 5,695,550 to Marx, et al., U.S. Pat. No. 5,637,444, to Matsumoto, U.S. Pat. No. 5,308,388, to Schell, U.S. Pat. No. 5,279,648 to Chase, U.S. Pat. No. 5,164,000 to Gamblin, and U.S. Pat. No. 4,854,969, to Bassemir, et al. Each of these patents are hereby expressly incorporated by reference in their entireties.

In further embodiments, the methods herein can be used in conjunction with one or more other methods that prevent microbial propagation in fountain solutions, including: centrifuging, filtering, aerating, cleaning the sump, maintaining proper concentration of fountain solution, adding biocides, and the like, for example. Accordingly, in certain embodiments, the methods provided herein relate to applying high-frequency ultrasound either before, during, or after one or more the above-mentioned treatment methods, or other like microbial treatments. Examples of apparatuses for treating fountain solutions that, the methods herein can be used in conjunction with are disclosed in U.S. Pat. No. 6,293,198, to Mizuno and U.S. Pat. No. 5,622,620 to Meenan, et al., for example. Both of these patents are expressly incorporated by reference in their entireties.

While the foregoing description details certain embodiments of the teachings herein, it will be appreciated, however, that no matter how detailed the foregoing appears in text, the devices and methods herein can be practiced in many ways. As is also stated above, it should be noted that the use of particular terminology when describing certain features or aspects of the teachings herein should not be taken to imply that the terminology is being re-defined herein to be restricted to including any specific characteristics of the features or aspects of the teachings herein with which that terminology is associated. The scope of the teachings herein should therefore be construed in accordance with the appended claims and any equivalents thereof.

What is claimed is:

1. A method of treating a fountain solution comprising simultaneously exposing said fountain solution to gas microbubbles and ultrasound of a frequency of 100 kHz or higher.

2. The method of claim 1, wherein said gas microbubbles consist essentially of ambient air.

3. The method of claim 1, wherein the average diameter of the gas microbubbles is less than about 50 μm.

4. An apparatus for reducing the presence of live microorganisms in a fountain solution comprising:
a compartment for holding a reservoir of fountain solution;
an ultrasound emitter configured to emit ultrasound signals at a frequency higher than 100 kHz into said compartment; and
a gas microbubble emitter configured to emit gas microbubbles having an average diameter of less than 1 mm into the ultrasound field in the compartment containing the fountain solution.

5. The apparatus according to claim 4, wherein the gas microbubbles are not ozone microbubbles.

6. The apparatus according to claim 4, wherein the gas microbubbles are selected from the group consisting of air and oxygen microbubbles.

7. The apparatus according to claim 4, wherein the average diameter of the gas microbubbles is less than 50 μm.

8. The apparatus according to claim 4, wherein the average diameter of the gas microbubbles is less than 30 μm.

9. The apparatus according to claim 4, wherein the ultrasound emitted into the compartment does not generate a stationary field phenomenon.

10. The apparatus according to claim 4, further comprising an electromagnetic radiation emitter configured to emit electromagnetic radiation in the visible range into the ultrasound field.

11. The apparatus according to claim 4, wherein the microorganisms are bacteria.

12. A method of treating fountain solution comprising:
collecting fountain solution from a fluid routing circuit;
routing said fountain solution into a compartment;
simultaneously exposing said fountain solution in compartment to gas microbubbles and ultrasound of a frequency of 100 kHz or higher.

13. The method of claim 12, wherein said gas microbubbles consist essentially of ambient air.

14. The method of claim 12, wherein the average diameter of said microbubbles is less than about 50 micrometers.

15. A machining system comprising:
a printing apparatus;
a fountain solution circuit connected to the printing apparatus;
a compartment for holding a reservoir of fountain solution through which said fountain solution is routed;
an ultrasound emitter configured to emit ultrasound signals at a frequency higher than 100 kHz into said compartment; and
a gas microbubble emitter configured to emit gas microbubbles having an average diameter of less than 1 mm into the ultrasound field in the compartment containing the fountain solution.

16. The apparatus according to claim 15, wherein the gas microbubbles are not ozone microbubbles.

17. The apparatus according to claim 15, wherein the gas microbubbles are selected from the group consisting of air and oxygen microbubbles.

18. The apparatus according to claim 15, wherein the average diameter of the gas microbubbles is less than 50 μm.

19. The apparatus according to claim 15, wherein the average diameter of the gas microbubbles is less than 30 μm.

20. The apparatus according to claim 15, wherein the ultrasound emitted into the compartment does not generate a stationary field phenomenon.

21. The apparatus according to claim 15, further comprising an electromagnetic radiation emitter configured to emit electromagnetic radiation in the visible range into the ultrasound field.

* * * * *